United States Patent [19]

Bronstert et al.

[11] Patent Number: 4,558,104

[45] Date of Patent: Dec. 10, 1985

[54] CONTINUOUS PREPARATION OF ISOBUTYLENE POLYMERS

[75] Inventors: Klaus Bronstert, Carlsberg; Johann Nickl, Bad Durkheim; Hans-Joachim Krause, Ludwigshafen; Werner Schmitt, Frankenthal, all of Fed. Rep. of Germany

[73] Assignee: BASF Aktiengesellschaft, Fed. Rep. of Germany

[21] Appl. No.: 566,292

[22] Filed: Dec. 28, 1983

[30] Foreign Application Priority Data

Jan. 5, 1983 [DE] Fed. Rep. of Germany ....... 3300155

[51] Int. Cl.⁴ .............................................. C08F 2/00
[52] U.S. Cl. ...................................... 526/65; 526/68; 526/70; 526/88; 526/348.7
[58] Field of Search ............................. 526/68, 65, 88

[56] References Cited

U.S. PATENT DOCUMENTS

| | | | |
|---|---|---|---|
| 2,405,480 | 8/1946 | Wilde | 526/339 X |
| 2,491,710 | 12/1949 | Calfee et al. | 526/88 |
| 2,533,058 | 12/1950 | Shaffer et al. | 526/65 |
| 2,561,226 | 7/1951 | Powers | 526/68 X |
| 2,772,255 | 11/1956 | Ernst et al. | 260/85.3 |
| 2,906,791 | 9/1959 | Baumann et al. | 260/680 |
| 3,033,836 | 5/1962 | Tegge et al. | 260/85.3 |
| 3,129,205 | 4/1964 | Rowe et al. | 260/85.3 |
| 3,455,890 | 7/1969 | Davidson | 260/85.3 |
| 4,151,113 | 4/1979 | Thaler | 252/429 R |
| 4,379,899 | 4/1983 | Marsh | 526/348.7 |
| 4,400,493 | 8/1983 | Abernathy, Jr. et al. | 526/348.7 |

FOREIGN PATENT DOCUMENTS

| | | |
|---|---|---|
| 1186 | 3/1979 | European Pat. Off. |
| 48627 | 3/1982 | European Pat. Off. |
| 1157048 | 7/1969 | United Kingdom |

*Primary Examiner*—Joseph L. Schofer
*Assistant Examiner*—S. Babajko
*Attorney, Agent, or Firm*—Keil & Weinkauf

[57] ABSTRACT

Isobutylene polymers are prepared continuously, in aliphatic $C_3$-$C_6$-hydrocarbons in the presence of soluble cationic polymerization initiators and coinitiators at from $-40°$ to $40°$ C. and under from 0.01 to 10 bar, and the solvents and monomers vaporized during the polymerization are recycled, by a process in which the liquid stream of the monomer solution, containing 40-95, in particular 50-85, percent by weight of the monomers, the liquid streams of the recycle and of the coinitiator solution and the separate stream of the initiator solution are combined in a first zone containing the polymerization zone, and the resulting polymer solution is taken off continuously through a second zone vertically below the first zone. The liquid streams of the monomer solution, the coinitiator solution and the recycle can furthermore be fed into the first zone separately from one another.

3 Claims, 1 Drawing Figure

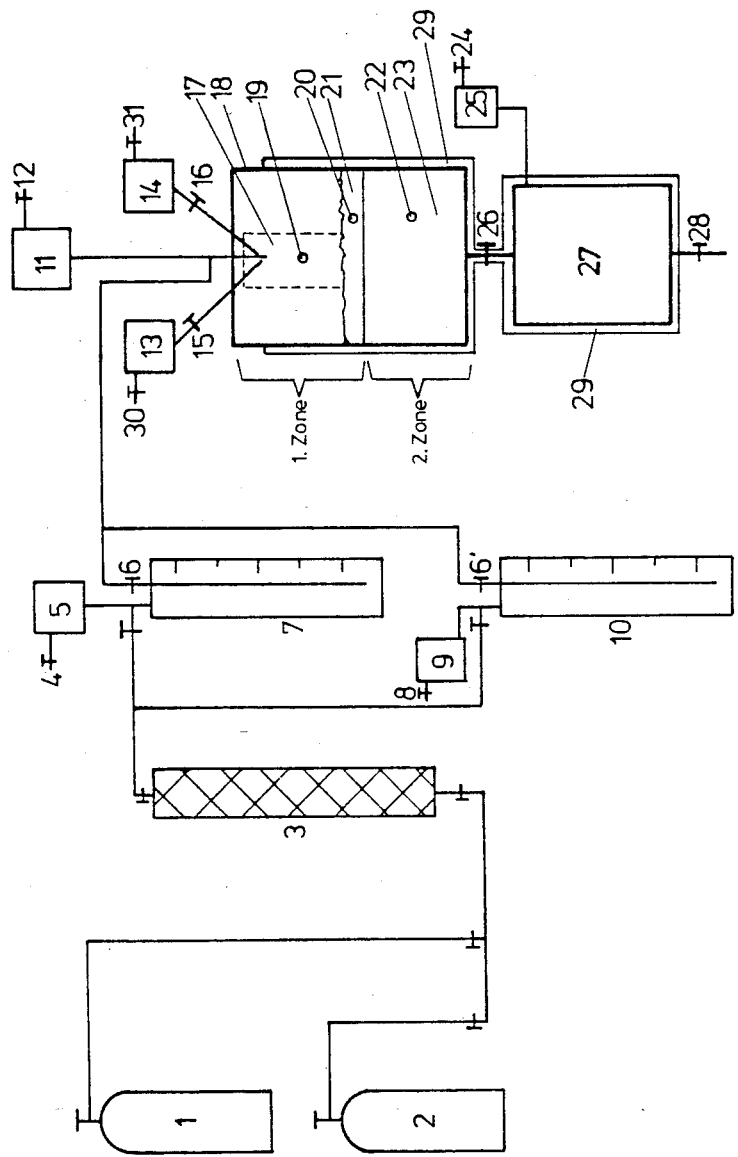

CONTINUOUS PREPARATION OF ISOBUTYLENE POLYMERS

The present invention relates to a process for the continuous preparation of isobutylene polymers by homopolymerization of isobutylene or copolymerization of isobutylene with compounds which are copolymerizable with it, in an aliphatic $C_3$–$C_6$-hydrocarbon as the solvent, in the presence of, in each case, from 0.001 to 0.1 percent by weight, based on the weight of the monomers, of a cationic polymerization initiator and a coinitiator which are soluble in the solvent, at from $-40°$ to $40°$ C. under from 0.01 to 10 bar in the absence of air and of moisture, the solvents and monomers vaporized during the polymerization being taken off continuously, liquefied, and fed again into the polymerization zone as a liquid recycle.

In such polymerization processes for the preparation of homopolymers or copolymers of isobutylene, the polymerization has to be carried out in a readily volatile organic solvent in the presence of a polymerization initiator, and the heat of reaction produced in the polymerization reaction has to be conducted away by vaporizing the solvent.

It is known that, in order to satisfy these requirements, the polymerization of the isobutylene has to be started using a Friedel-Crafts compound as an initiator, and, to conduct away the heat of reaction, the polymerization has to be carried out in the presence of a low-boiling inert solvent which vaporizes under the reaction conditions. In the conventional processes, the vaporized solvent is taken off continuously, liquefied, and fed again to the polymerization zone as a liquid recycle (cf. U.S. Pat. Nos. 2,906,793 and 3,129,205). It has also been disclosed that homopolymerization and copolymerization of isobutylene can be carried out in the presence of an aliphatic hydrocarbon or an alkyl halide as a solvent, using a cationic polymerization initiator (cf. U.S. Pat. Nos. 2,772,255, 3,033,836 and 3,455,890). To do this, a solution of a Friedel-Crafts initiator in a $C_1$–$C_3$-alkyl halide is added to a cooled solution of the isobutylene, while the reaction mixture is stirred (cf. U.S. Pat. No. 3,455,890). It has also been disclosed that a polymerization initiator which is soluble in an aliphatic hydrocarbon can be used, together with a coinitiator, for the homopolymerization or copolymerization of isobutylene (cf. U.S. Pat. No. 4,151,113 and European Laid-Open Application Nos. 48,627 and 1,186). In this case, the initiator is, in particular, ethyl aluminum dichloride, the coinitiator is tert.-butyl chloride, and the solvent is a low-boiling aliphatic hydrocarbon.

However, the conventional processes for the homopolymerization or copolymerization of isobutylene have the disadvantage that, in order to carry out the reaction in a reliable manner, the reaction mixture in the polymerization zone has to be stirred, in addition to other special measures being taken. To do this, stirring elements are required in the apparatus. Moreover, the resulting product is a mixture of polymers having very different degrees of polymerization, and has a relatively low mean molecular weight at a certain temperature within the range from $-40°$ to $40°$ C. Furthermore, relatively high initiator concentrations are generally employed, which leads to an isobutylene polymer contaminated with substantial amounts of initiator. The conventional processes also have the disadvantage that they always give a low space-time yield. Although this yield could be increased by increasing the concentration of the polymerization initiator, the resulting isobutylene polymer would be highly contaminated with initiator, and it would be more difficult to carry out the reaction reliably. Another disadvantage of the conventional processes is that there is a large amount of reactive monomers in the polymerization reactors, and this constitutes a substantial safety risk.

It is an object of the present invention to provide a continuous process for the homopolymerization or copolymerization of isobutylene, without the above disadvantages being present. It is a further object of the present invention to prepare a homogeneous isobutylene polymer which is substantially free of initiators by a procedure which is industrially simple and reliable.

We have found that this object is achieved, in accordance with the invention, if the liquid stream of the monomer solution, containing 40–95 percent by weight of the monomers, the liquid streams of the recycle and of the coinitiator solution and the separate stream of the initiator solution are combined in a first zone containing the polymerization zone, and the resulting polymer solution is taken off continuously through a second zone located vertically below the first zone.

In a preferred procedure, the liquid streams of the monomer solution, the coinitiator solution and the recycle are fed into the first zone separately from one another. In a particularly preferred process, the monomer solution contains from 50 to 85 percent by weight of the monomers.

Processes for the preparation of isobutylene polymers by homopolymerization and copolymerization of isobutylene have long been known per se, and are described in detail in, for example, the publications cited at the outset. Particularly suitable compounds which are cationically copolymerizable with isobutylene are but-1-ene, isobutene, 4-methylpent-1-ene, oct-1-ene, 2-methylbut-1-ene, styrene, alkyl-substituted styrenes, e.g. α-methylstyrene, and other vinyl compounds, such as propylene, isopentene, vinyl ethers and halogen-substituted styrenes, e.g. p-chlorostyrene. For example, diolefins or cyclodiolefins, e.g. butadiene, isoprene, cyclopentadiene, vinylnorbornene or β-pinene, are also suitable for cationically initiated copolymerization with isobutylene by the present process. A detailed list of comonomers which can be cationically copolymerized with isobutylene is contained in U.S. Pat. No. 3,455,890 cited at the outset, so that further description is not necessary. The resulting isobutylene copolymers usually contain from 0.1 to 50, preferably from 0.5 to 25, percent by weight of comonomers as copolymerized units; however, larger amounts of comonomers may also be present in the copolymer. The novel process is preferably restricted to the continuous homopolymerization of isobutylene to give polyisobutylene. The polyisobutylenes obtained in accordance with the Application are of the formula

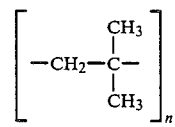

where n is from 170 to 2,100, preferably from 450 to 1,600. The above polyisobutylenes have weight average molecular weights $\overline{M}_w$ of from 9,500 to 120,000, preferably from 25,000 to 90,000, determined by gel permeation chromatography, and, at room temperature, are viscous, tacky and transparent materials which have densities of from 0.92 to 0.93 g/cm$^3$ according to DIN 53,479 and have a variety of uses as sealing compositions, contact adhesives and viscosity index improvers in engine oils. The homopolymerization or copolymerization of the isobutylene is carried out in solution, an aliphatic $C_3$-$C_6$-hydrocarbon being used as the solvent. Particularly suitable solvents are n-butane, isobutane and an n-butane isobutane mixture containing from 10 to 50 parts by volume of n-butane. A useful solvent for the polymerization initiator is, for example, n-hexane or n-butane. The choice of the solvent depends on the temperature at which the polymerization is carried out. At low temperatures, propane can be used. The organic solvents employed should be anhydrous, and, if necessary, are purified.

The homopolymerization or copolymerization of the isobutylene is carried out in the presence of, in each case, from 0.001 to 0.1, preferably from 0.002 to 0.007, percent by weight, based on the weight of the monomers polymerized, of a cationic polymerization initiator and a coinitiator which are soluble in the above solvents. Furthermore, it is very particularly advantageous to use, in each case, only from 0.001 to 0.002 percent by weight of the initiator and the coinitiator. Particularly suitable polymerization initiators which are soluble in the $C_3$-$C_6$-hydrocarbons are the compounds which are conventionally used for the polymerization of isobutylene, of the general formula $RAlX_2$ or $R_2AlX$, where R is $C_1$-$C_7$-alkyl and the radicals X are identical or different halogen atoms from the group consisting of chlorine and bromine (cf. U.S. Pat. No. 4,151,113). Particularly useful compounds are ethyl aluminum dichloride ($C_2H_5AlCl_2$), isobutyl aluminum dichloride and ethyl aluminum dibromide. Suitable coinitiators are the conventional R-Y coinitiators, in which R is a $C_3$-$C_6$-hydrocarbon radical and Y is chlorine or bromine (cf. European Laid-Open Application Nos. 1,186 and 48,627). Examples of compounds which are suitable coinitiators are tert.-butyl chloride (t-BuCl), tert.-butyl bromide, tert.-amyl chloride and benzyl chloride. It is known that the cationic polymerization initiators are polymerization catalysts which are capable of polymerizing isobutylene, or a mixture of isobutylene with other copolymerizable monomers, by a cationic polymerization mechanism. Ionic polymerization mechanisms permit the preparation of polymers with a particularly uniform structure.

The homopolymerization or copolymerization of isobutylene is carried out at from $-40°$ to $+40°$ C., preferably from $-25°$ to $+10°$ C., under from 0.01 to 10, preferably from 0.1 to 3.0, bar. A temperature of from $-20°$ to $+7°$ C. and a pressure of from 500 to 1,020 mbar are particularly suitable. The preparation of the isobutylene polymers is carried out with strict exclusion of atmospheric oxygen and of moisture. To do this, dry, oxygen-free inert gas, in particular nitrogen, can be introduced into the polymerization system, and the solvents and monomers used, before being introduced into the polymerization zone, can be freed from traces of entrained and dissolved moisture with the aid of a molecular sieve or some other drying agent.

The solvents and monomers vaporized by the heat of polymerization evolved during the homopolymerization or copolymerization of the isobutylene are removed continuously from the polymerization zone, liquefied by cooling, and fed again into the polymerization zone as a liquid recycle. Hence, the low-boiling solvents, such as n-butane or isobutane, and the monomers conduct the heat away from the polymerization zone during the polymerization. The principle of evaporative cooling is known, and is described in, for example, the publications cited at the outset, ie. U.S. Pat. Nos. 2,506,793, 3,129,205, 2,772,255, 3,033,836 and 3,455,890, so that further description is unnecessary here. In the process according to the Application, the reaction mixture in the polymerization zone is not stirred, and furthermore the resulting heat of polymerization need not be conducted away via the outer walls by cooling.

In accordance with the invention, the liquid streams of the monomer solution, of the recycle and of the coinitiator solution, and the separate stream of the polymerization initiator solution, should be combined in a first zone containing the polymerization zone. The solution of the monomer or monomers in one of the above aliphatic $C_3$-$C_6$-hydrocarbons should contain from 40 to 95, preferably from 50 to 85, in particular from 60 to 80, percent by weight of the monomers. The recycle consists of the condensed parts of the vaporized monomers and solvents, and flows from a conventional type of evaporative cooler back into the polymerization zone of the first zone. The amount of recycle depends on the amount of initiator, the polymerization temperature and the monomer composition, and is usually from 1 to 3 times the amount of monomer solution. In order to ensure ease of metering, the initiator and the coinitiator are advantageously dissolved in a solvent. The coinitiator solution, which consists of one part by weight of coinitiator and from 10 to 250 parts by weight of solvent, is used in a small amount compared with the monomer solution; in general, the amount of this solution is 0.01-10 percent by weight, based on the amount of monomer solution. An essential feature of the invention is that the solution containing the polymerization initiator is fed into the polymerization zone separately from the other liquid streams. In a preferred process, the liquid streams of the monomer solution, of the coinitiator solution and of the recycle can also be fed into the polymerization zone in the first zone separately from one another and, in each case, separately from the initiator solution. The initiator solution, which consists of one part by weight of initiator and from 10 to 400 parts by weight of solvent, is fed into the polymerization zone in amounts of from 0.01 to 15 percent by weight, based on the amount of monomer solution. The initiator and the coinitiator are dissolved in one of the above aliphatic $C_3$-$C_6$-hydrocarbons, preferably n-hexane or n-butane. The liquid streams are fed into a first zone containing the polymerization zone. The latter occupies from 1 to 60 percent by volume of the first zone, and essentially consists of a mixing zone, in which the four liquid streams meet, the polymerization begins abruptly and the polymerizing mixture flows freely downwards, and, below this, a zone consisting of foam, in which the reactants which have been brought into contact continue reacting to completion. Preferably, the polymerization zone occupies from 10 to 50 percent by volume of the first zone. Combining the various liquid streams and mixing the different solutions and the recycle are carried out without stirring, for example by means of the various liquid streams flowing together directly, or by mixing in mixing nozzles or spraying by means of nozzles.

The polymerizing mixture falls from the mixing elements or the mixing zone onto the foam-covered surface of the 2nd zone, which is located vertically below the first zone. In this foam layer, which also belongs to the 1st zone and in which the reactants continue reacting, the polymerization is completed. The resulting polymer solution, which then no longer contains any vapor bubbles and which collects in the 2nd zone, is taken off continuously through the 2nd zone, in a downward direction. In the novel process, the viscosity of the polymer solution in the second zone is preferably from 2 to $5.10^4$, particularly preferably from 40 to 500, Pas, measured in accordance with ASTM D-1601. As a result of this viscosity, mixing with the foam from the polymerization zone is prevented, so that a pure solution comprising the isobutylene polymer and the solvent can be taken off in a downward direction.

The mean residence time of the reaction mixture in the polymerization zone is in general from 0.1 to 35, preferably from 1 to 10, in particular from 4 to 8, minutes. The mean residence time of the reaction mixture in the mixing zone, in which the four liquid streams meet and where the polymerization begins, is from 0.05 to 0.6, preferably from 0.1 to 0.5, seconds. The mixing zone, which for the purposes of the present invention comprises the volume of the mixing elements and of the product stream falling to the surface of the 2nd zone, occupies from 0.04 to 0.5 percent by volume of the first zone. In this mixing zone, conversions of the monomers as high as 80-90% by weight can be achieved. The mean residence time is defined as the ratio of the volume of the polymerization or mixing zone to the average volume of polymer, solvent and monomer which passes, per time unit, through the polymerization or mixing zone.

When the polymer solution has been discharged from the reactor, the initiator is advantageously deactivated with water or an alcohol. The isobutylene polymer is isolated by a conventional method, by evaporating the solvent at as high as 260° C. and under 0.1–500 mbar. In this manner, the solvent is recovered. After purification by an appropriate method, it can be reused in the polymerization process.

The particular advantage of the invention is that the homopolymerization or copolymerization takes place rapidly and virtually completely when the monomer solution and initiator solution come together in high concentration outside the polymer solution present in the second zone; as a result, weight average molecular weights $\overline{M}_w$ of from 9,500 to 120,000 can be achieved at relatively high temperatures. Another advantage of the novel process is that, because the monomer is polymerized continuously as it flows in, only very small amounts of reactive material are present in the reactor, and hence an uncontrolled polymerization of relatively large amounts of monomers, particularly in the homopolymerization of isobutylene, is prevented.

It is also advantageous that, where isobutylene is homopolymerized by the process according to the invention, the conversion of isobutylene to polyisobutylene is greater than 99 percent by weight.

In the Examples which follow, percentages are by weight, unless stated otherwise.

EXAMPLE 1

Purification and liquefaction of isobutene and the solvent (see FIGURE).

99% pure gaseous isobutene from the steel pressure cylinder 1 was first purified in the purification tower 3, which was filled with a molecular sieve based on QM05-564 type synthetic zeolite from Grace, having a particle diameter of from 1.6 to 2.5 mm and a pore size of 3 Å, and was then condensed by means of the Dewar reflux condenser 5 and collected in the calibrated stock vessel (7). In the same manner, 99.5% pure gaseous n-butane from the steel pressure cylinder 2 was then purified and likewise condensed, and collected in stock vessel 7. A mixture of liquid isobutene and butane containing 60% by volume of isobutene was prepared. By continuous cooling using the Dewar reflux condenser 5, this mixture was kept in the liquid state.

In the same manner, a liquid isobutene/butane mixture was prepared in the stock vessel 10.

Polymerization

The reaction vessel 18, having a capacity of 3.8 liters, was brought to a pressure of 500 mbar via the connection 12. Thereafter, the isobutene/butane mixture from the stock vessel 7, a 0.05 molar solution of $C_2H_5AlCl_2$ in n-hexane from the stock vessel 13 and a 0.05 molar solution of t-butyl chloride in n-hexane from the stock vessel 14 were fed simultaneously into the mixing zone 17 by opening stopcocks 6, 15 and 16. The feed rate of the liquid isobutene/butane mixture was 8 liters/hour, while the feed rates of the initiator solution and the coinitiator solution were each 0.001 mole hour (0.127 g/hour of $C_2H_5AlCl_2$ and 0.0926 g/hour of t-butyl chloride).

The polymerization began spontaneously at the point at which the solutions came into contact in the mixing zone 17, and continued during the free fall of the mixture and in a foam layer 21 which has formed vertically below the mixing zone, the foam layer and the mixing zone together constituting the polymerization zone. As the polymerization progressed, an increasing amount of a completely stationary, clear bubble-free polymer solution 23 formed below the foam layer, the space, in reaction vessel 18, which results above the polymer solution 23 constituting the first zone, and the space below the foam layer constituting the second zone. When a pressure of 500 mbar was maintained in the reaction vessel, the temperature at the measuring points 19, 20 and 22 was −15° C. When the reaction vessel 18 was filled to about half its height with polymer solution, and a foam layer about 5 cm thick had formed, polymer solution was conveyed continuously through the stopcock 26 into the vessel 27 which had likewise been brought to 500 mbar via connection 24, the amount of polymer solution transferred being such that a constant level was maintained in the reaction vessel 18. In the discharge vessel 27, vaporized butane was continuously reliquefied in the Dewar reflux condenser 25. When the vessel 27 was filled with polymer solution, the stopcock 26 was closed and the vessel 27 was brought to atmospheric pressure or to an $N_2$ superatmospheric pressure of about 0.02 bar in order to be able to discharge the polymer solution via the stopcock 28. When vessel 27 had been emptied, the stopcock 28 was closed again, and the pressure in vessel 27 was once again brought to 500 mbar. Stopcock 26 was once again opened, and polymer solution was discharged continuously from the reaction vessel 18 into the discharge vessel 27 at a rate such that a constant level was once again maintained in the vessel 18.

During the polymerization, the stock vessels 7 and 10 were connected alternately to the reaction vessel 18, and, when empty, were once again filled with isobutene/butane mixture. The continuous polymerization was maintained in this manner for as long as 10 hours. The isobutylene polymer was isolated by devolatilization of the discharged polymer solution at 210° C. and under 0.3 mbar. The results of the experiment are shown in Table 1 below.

Apart from the pressure cylinders 1 and 2, the apparatus described consisted of glass components. The polymerization was carried out in the absence of air, flushing with $N_2$ gas being effected via the connections 4, 8, 12, 24, 30 and 31.

The reaction vessel 18 and discharge vessel 27 were surrounded by a jacket through which flowed a liquid having the same temperature as that measured in the reaction vessel at the temperature-measuring points.

A mixture of dry ice and methanol was used as the cooling medium in the Dewar reflux condensers 5, 9, 11 and 25.

EXAMPLE 2

The apparatus described in Example 1 (see FIGURE) was used. The condensed isobutene/butane mixture collected in stock vessels 7 and 10 consisted of 65 vol % of isobutene and 35 vol % of butane. 6.65 liters/hour of this isobutene/butane mixture were fed continuously into the mixing zone 17 of the reaction vessel 18. The $C_2H_5AlCl_2$ solution and the t-butyl chloride solution were each fed in at a rate of 0.00105 mole/hour (0.133 g/hour of $C_2H_5AlCl_2$ and 0.097 g/hour of t-butyl chloride). The pressure in the reaction vessel was maintained at 700 mbar, and the temperature at the temperature-measuring points 19, 20 and 22 was −7° C. Under these conditions, the continuous polymerization was maintained over a period of several hours. The polyisobutylene was isolated as described in Example 1. The results are shown in Table 1.

EXAMPLE 3

The apparatus described in Example 1 (see FIGURE) was used for the polymerization. The condensed isobutene/butane mixture collected in stock vessels 7 and 10 consisted of 76 vol % of isobutene and 24 vol % of butane. 6.25 liters/hour of this isobutene/butane mixture were fed continuously into reaction vessel 18 (mixing zone 17). The $C_2H_5AlCl_2$ solution and the t-butyl chloride solution in n-hexane were each fed in at a rate of 0.00104 mole/hour (0.132 g/hour of $C_2H_5AlCl_2$ and 0.096 g/hour of t-butyl chloride). The pressure in the reaction vessel 18 was maintained at 1,020 mbar, and the temperature at the temperature-measuring points 19, 20 and 22 was 6° C. Under these conditions, the continuous polymerization was maintained over a period of several hours. The polyisobutylene was isolated as described in Example 1. The results are shown in Table 1.

| Example | 1 | 2 | 3 |
| --- | --- | --- | --- |
| Rate of discharge of PIB, kg/hour | 3.0 | 2.7 | 3.1 |
| Space-time yield, kg of PIB per liter per hour | 0.79 | 2.7 | 3.1 |
| Conversion of isobutene, % | 99.9 | 99.9 | 99.9 |
| Activity, g of PIB/g of $C_2H_5AlCl_2$/hour | 21,483 | 20,255 | 23,470 |
| Molecular weight $\overline{M}w$ (determined by the GPC method) | 59,000 | 45,600 | 27,500 |
| Heterogeneity factor $\overline{M}_n/\overline{M}_w$ (determined by the GPC method) | 4.5 | 5.2 | 4.3 |
| Viscosity of the polymer solution in the 2nd zone in Pas | 74 | 86 | 105 |

PIB = polyisobutylene
GPC = gel permeation chromatography
$\overline{M}_n$ = number average molecular weight
$\overline{M}_w$ = weight average molecular weight

We claim:
1. A process for the continuous preparation of an isobutylene polymer by homopolymerization of isobutylene or copolymerization of isobutylene with compounds which are copolymerizable with it, in an aliphatic $C_3-C_6$-hydrocarbon as the solvent, in the presence of, in each case, from 0.001 to 0.1 percent by weight, based on the weight of the monomers, of a cationic polymerization initiator and a coinitiator which are soluble in the solvent, at from −40° to 40° C. under from 0.01 to 10 bar in the absence of air and of moisture, the solvents and monomers vaporized during the polymerization being taken off continuously, liquefied, and fed again into the polymerization zone as a liquid recycle, wherein the liquid stream of the monomer solution, containing 40–95 percent by weight of the monomers, the liquid streams of the recycle and of the coinitiator solution and the separate stream of the initiator solution are combined in the mixing zone which is situated in a polymerization first zone and in which the polymerizing mixture flows freely in a downward direction onto the foam covered surface in which the polymerization continues; the resulting polymer solution is then collected in a second zone located vertically beneath the first zone, without any mixing of the polymer solution with the polymerizing mixture of the polymerization zone taking place; and finally the pure solution consisting of the isobutylene polymer and solvent is withdrawn continuously in a downward direction.

2. The process of claim 1, wherein the liquid streams of the monomer solution, of the coninitiator solution and of the recycle are furthermore fed into the first zone separately from one another.

3. The process of claim 1, wherein the monomer solution contains from 50 to 85 percent by weight of the monomers.

* * * * *